(12) United States Patent
Minematsu et al.

(10) Patent No.: US 7,983,651 B2
(45) Date of Patent: Jul. 19, 2011

(54) COMMUNICATION APPARATUS, COMMUNICATION METHOD AND COMMUNICATION SYSTEM

(75) Inventors: Mika Minematsu, Kawasaki (JP);
Yasuyuki Nishibayashi, Kawasaki (JP);
Shinya Murai, Kawasaki (JP);
Masataka Goto, Yokohama (JP);
Kensaku Yamaguchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 835 days.

(21) Appl. No.: 12/026,314

(22) Filed: Feb. 5, 2008

(65) Prior Publication Data
US 2008/0205316 A1 Aug. 28, 2008

(30) Foreign Application Priority Data
Feb. 7, 2007 (JP) ................................. 2007-028371

(51) Int. Cl.
*H04B 1/16* (2006.01)
*H04B 7/00* (2006.01)
(52) U.S. Cl. ............... 455/343.2; 455/127.5; 455/412.2; 455/566; 455/574
(58) Field of Classification Search ............. 455/343.2, 455/127.5, 574, 566, 412.2, 41.2, 343.4, 455/567, 412.1, 414.1, 343.3
See application file for complete search history.

(56) References Cited

U.S. PATENT DOCUMENTS

| | | | |
|---|---|---|---|
| 6,784,855 B2 | 8/2004 | Matthews et al. | 345/1.1 |
| 7,009,579 B1* | 3/2006 | Kondo et al. | 345/1.2 |
| 7,047,051 B2* | 5/2006 | Sackett et al. | 455/574 |
| 7,769,362 B2* | 8/2010 | Heidari-Bateni et al. | 455/343.4 |
| 7,831,278 B2* | 11/2010 | Want et al. | 455/557 |
| 7,864,720 B2* | 1/2011 | Jeyaseelan | 370/311 |
| 7,899,418 B2* | 3/2011 | Ishiyama et al. | 455/127.1 |
| 2008/0161072 A1* | 7/2008 | Lide et al. | 455/574 |
| 2008/0170116 A1* | 7/2008 | Nishibayashi et al. | 348/14.02 |

(Continued)

FOREIGN PATENT DOCUMENTS
JP 2002-323942 11/2002
(Continued)

OTHER PUBLICATIONS

U.S. Appl. No. 11/723,740, filed Mar. 21, 2007, Yasuyuki Nishibayashi.

(Continued)

*Primary Examiner* — Pablo N Tran
(74) *Attorney, Agent, or Firm* — Ohlandt, Greeley, Ruggiero & Perle, L.L.P.

(57) ABSTRACT

A communication apparatus includes an image information acquisition unit configured to acquire new image information to be transmitted to a display terminal through a wireless access point, a storage unit configured to temporarily store the image information, a decision unit configured to decide to change a state of a wireless communication processing unit of the display terminal from a power save state to a normal state when an amount of the image information stored in the storage unit is not less than a predetermined threshold value, a message generation unit configured to generate a change instruction message in response to decision of the decision unit, and a transmission unit configured to transmit the change instruction message to the display terminal through the wireless access point to instruct the display terminal to change the state of the wireless communication processing unit from the power save state to the normal state.

15 Claims, 15 Drawing Sheets

U.S. PATENT DOCUMENTS

| | | | | |
|---|---|---|---|---|
| 2008/0305839 A1* | 12/2008 | Karaoguz et al. | | 455/574 |
| 2009/0036173 A1* | 2/2009 | Rofougaran et al. | | 455/574 |
| 2009/0265749 A1* | 10/2009 | Yu | | 725/116 |
| 2010/0050006 A1* | 2/2010 | Nishibayashi et al. | | 713/320 |
| 2010/0304794 A1* | 12/2010 | Beninghaus et al. | | 455/574 |

FOREIGN PATENT DOCUMENTS

JP        2004-165791 A      6/2004

OTHER PUBLICATIONS

Search report from corresponding JP appln. No. 2007-028371 dated Jan. 6, 2009.

U.S. Appl. No. 11/819,656, filed Jun. 28, 2007, Yasuyuki Nishibayashi.

* cited by examiner

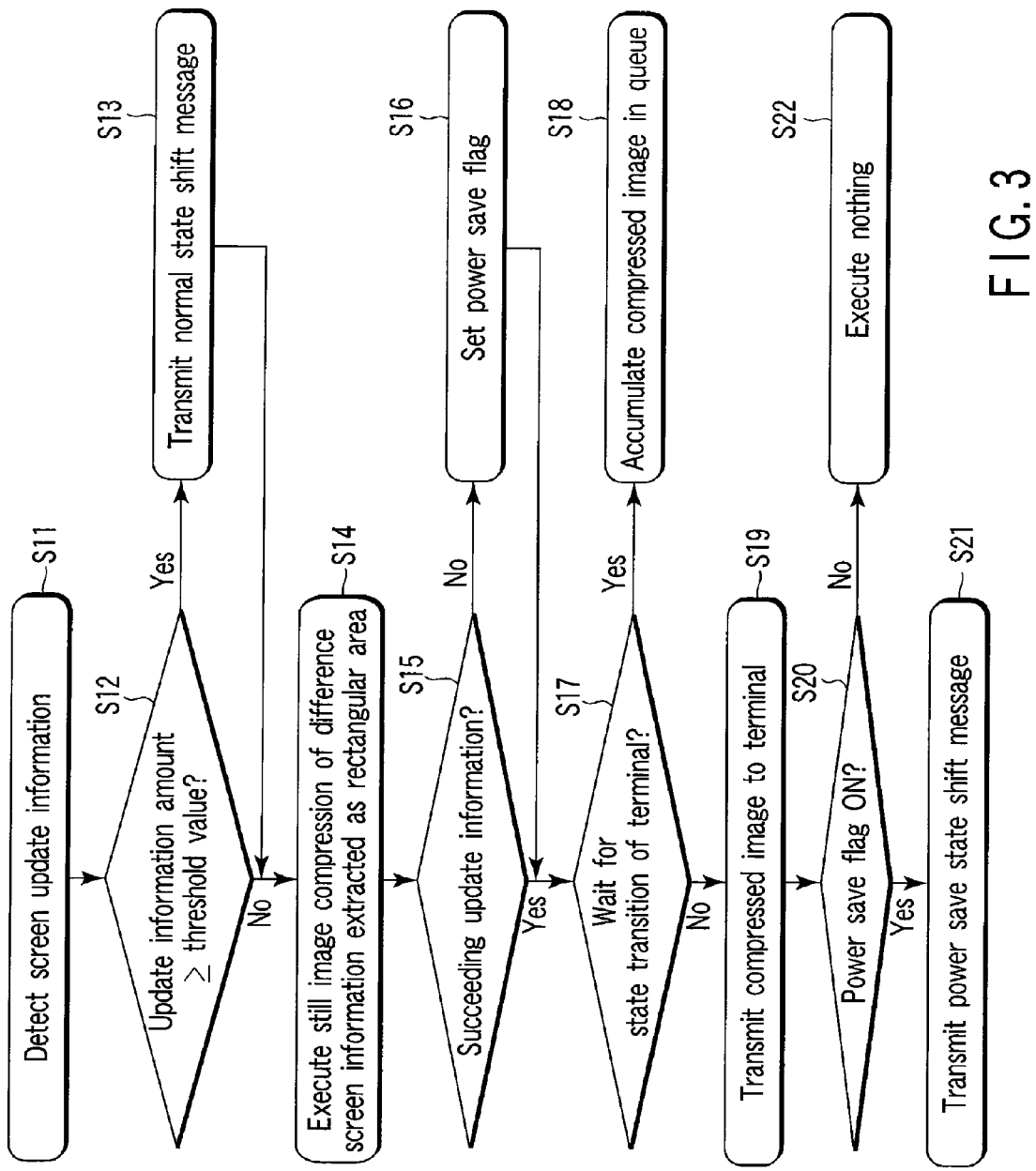
F I G. 3

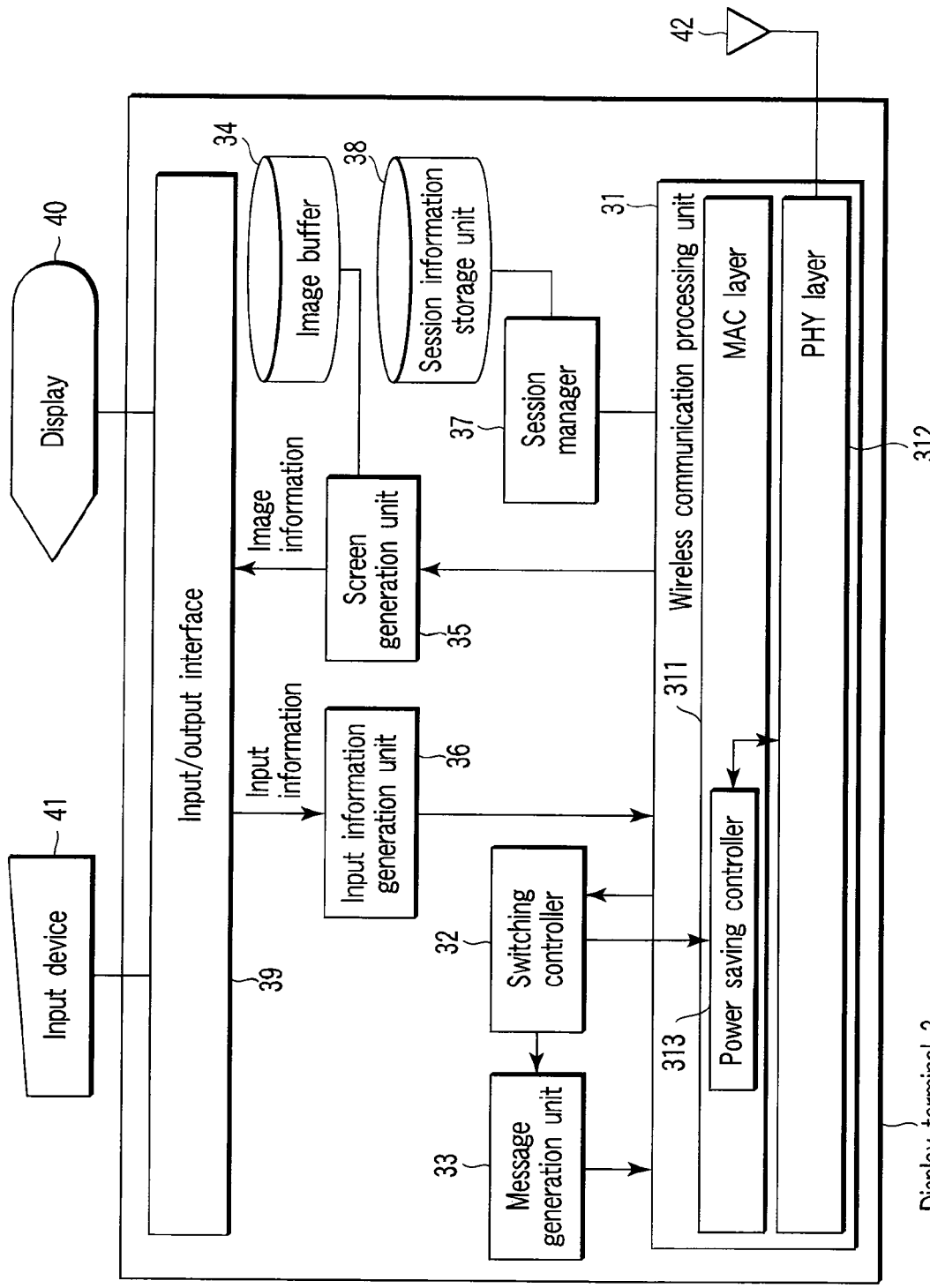
F I G. 7

Normal state shift message

Power save state shift message

Integration of compressed image and power save state shift message

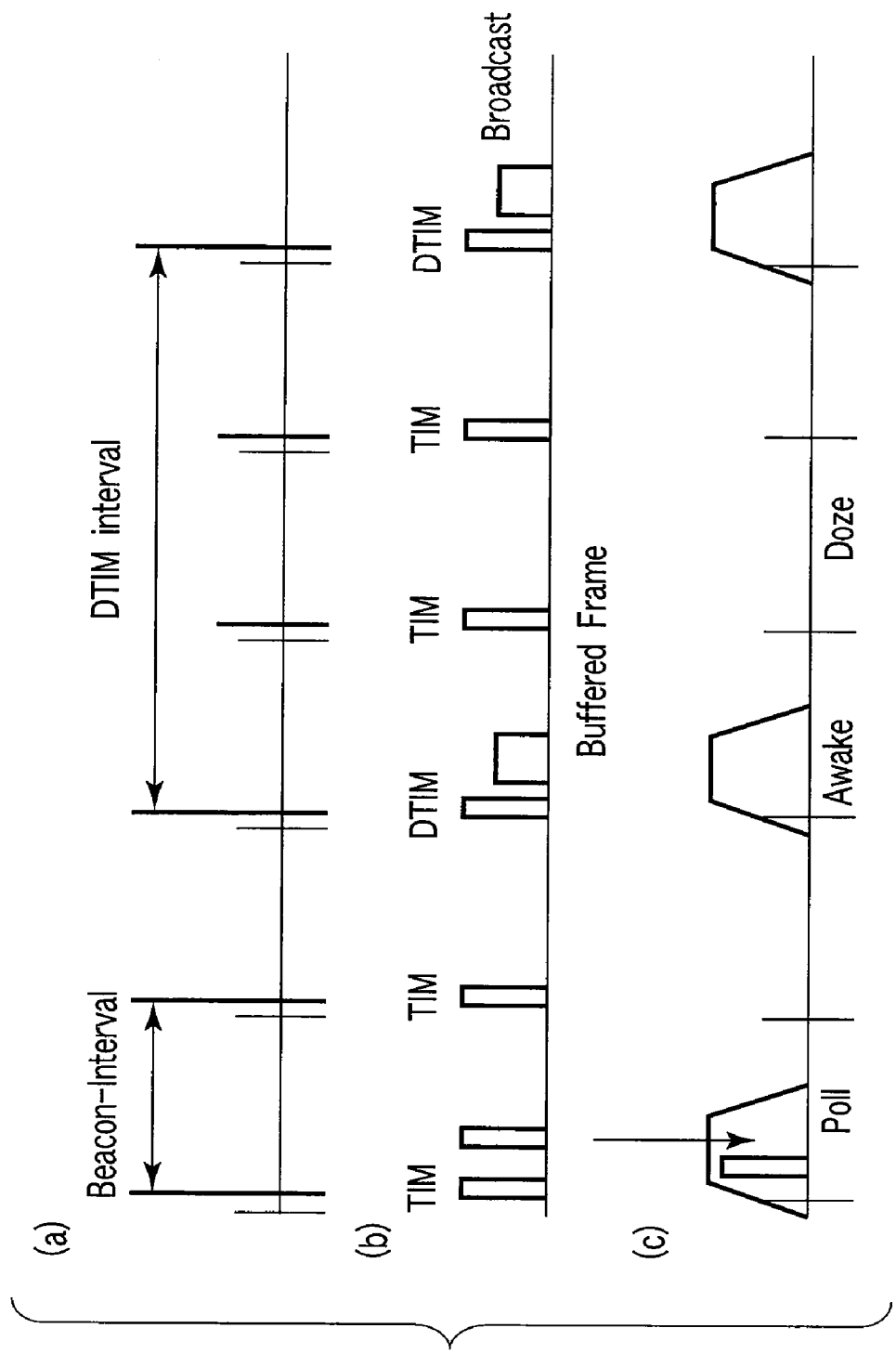
F I G. 12

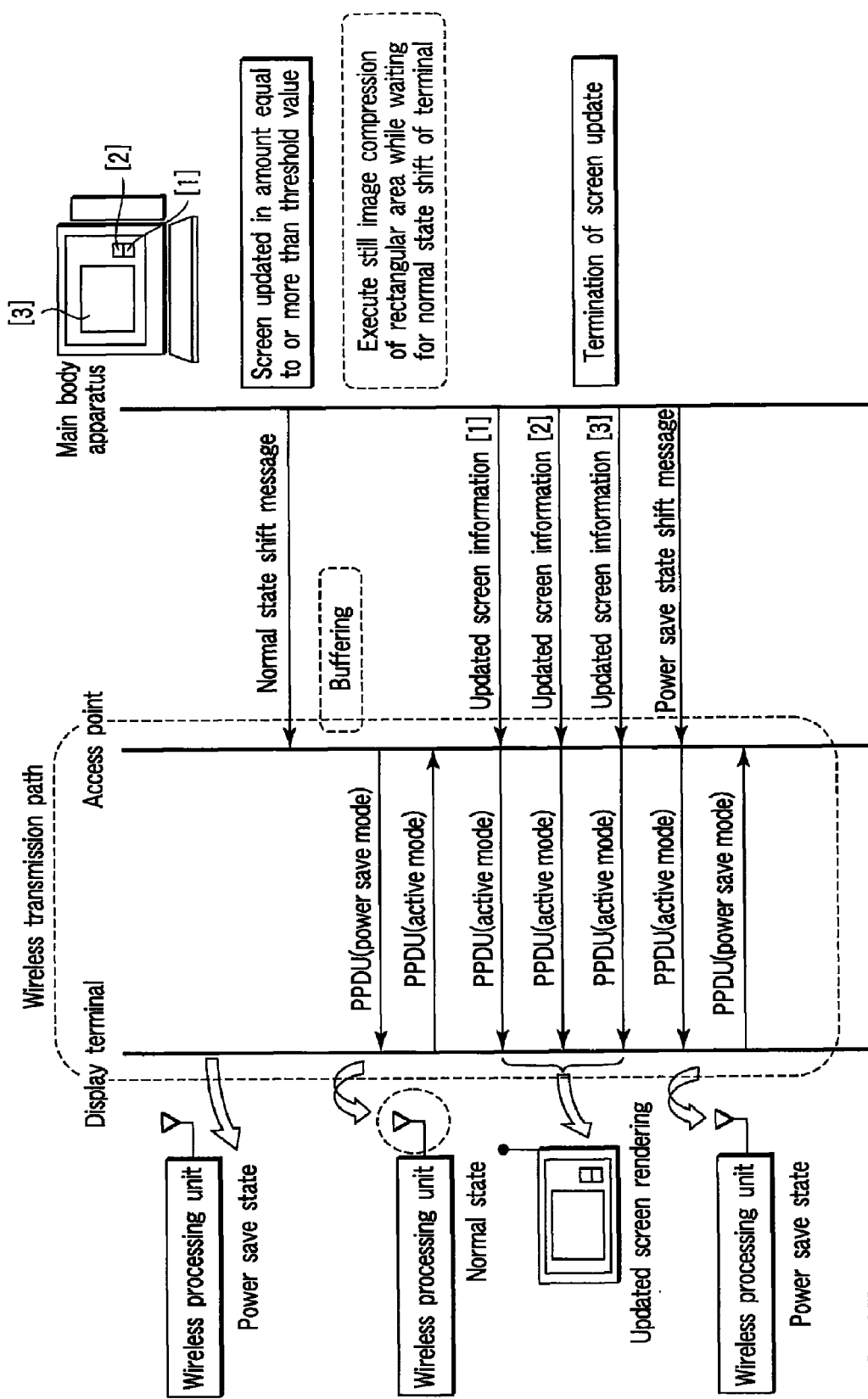
F I G. 17

COMMUNICATION APPARATUS, COMMUNICATION METHOD AND COMMUNICATION SYSTEM

CROSS-REFERENCE TO RELATED APPLICATIONS

This application is based upon and claims the benefit of priority from prior Japanese Patent Application No. 2007-028371, filed Feb. 7, 2007, the entire contents of which are incorporated herein by reference.

BACKGROUND OF THE INVENTION

1. Field of the Invention

The present invention relates to a communication apparatus, communication method, and communication system.

2. Description of the Related Art

There is a computing system which arranges a display terminal having a minimum of input/output interfaces on the user side and causes a main body apparatus located in a remote site to execute complex arithmetic processes for a purpose of improving usability.

For example, a system which projects the screen information of a main body apparatus (e.g., personal computer or server computer) on a display terminal via a network (e.g., U.S. Pat. No. 6,784,855) is known. In the system disclosed in U.S. Pat. No. 6,784,855, input information (e.g., pen input by a digitizer) at the display terminal is transmitted to the main body apparatus through the network. The main body apparatus executes an application program process for the input information and transmits the execution result of the process and screen update information to the display terminal through the network. The display terminal executes a rendering process on the basis of the received screen update information.

VNC (Virtual Network Computing) is known as a technique of efficiently transmitting the screen information of a main body apparatus on a remote network from the main body apparatus to a terminal apparatus. In VNC, upon detecting that the screen is updated, the value of readout pixel information is compared with that of pixel information precedingly transmitted to the display terminal, thereby determining the updated screen area which has changed from the preceding state. The updated screen area undergoes still image compression, and only the compressed difference screen information is transmitted to the display terminal. This suppresses consumption of the communication band. In VNC, if the screen largely changes (e.g., when a window moves), the screen information amount to be transmitted increases. To the contrary, if the screen change is small, the screen information amount to be transmitted decreases.

When the above system is implemented using, e.g., a wireless LAN complying with the IEEE802.11 standard, power is wasted even while the display terminal is not executing transmission and reception processes.

However, U.S. Pat. No. 6,784,855 does not deal with a technique associated with power saving.

Regarding the power saving method of IEEE802.11, a terminal has two operation modes: an active mode which is always in communication enable state and a power save mode which periodically switches between communication enable and disable states. In the power save mode, the terminal supplies power to the transmission/reception system of the wireless communication processing unit to shift to an awake state every interval of receiving a beacon frame from an access point. Except that period, the terminal shifts to a doze state and operates using minimum necessary power. A data frame directed to the terminal operating in the power save mode is buffered at an access point. The access point cannot transmit the data frame until a transmission request frame is received from the terminal. Hence, if the power saving control of IEEE802.11 is simply applied, data are accumulated in the buffer of the access point, and buffer overflow (i.e., frame loss) occurs.

JP-A 2002-323942(KOKAI) discloses a system including a computer and wireless display which can wirelessly communicate with each other. In this system, occurrence of a specific event (e.g., mail arrival or planned time of a schedule) in the computer is detected, and the operation state of the wireless display is switched from the power save state (power save mode) to the normal state (active mode).

However, JP-A 2002-323942(KOKAI) does not consider operation state notification control between the terminal and an access point assuming a wireless LAN of IEEE802.11 in association with power saving of the wireless communication processing unit. Hence, for example, even after the terminal shifts from the power save state to the normal state, the access point recognizes that the terminal is still in the power save state and continues to buffer frames directed to the terminal, resulting in buffer overflow (i.e., frame loss).

As described above, conventionally, when a communication apparatus transmits data to a display terminal normally operating in the power save state through an access point, the data from the communication apparatus to the display terminal may be lost at the access point.

BRIEF SUMMARY OF THE INVENTION

According to an aspect of the present invention, there is provided a communication apparatus for communicating with a display terminal including a wireless communication processing unit adopted to receive image information and a display screen to display the image information, which includes an image information acquisition unit configured to acquire new image information to be transmitted to the display terminal through a wireless access point; a storage unit configured to temporarily store the image information; a decision unit configured to decide to change a state of the wireless communication processing unit from a power save state to a normal state when an amount of the image information stored in the storage unit is not less than a predetermined threshold value; a message generation unit configured to generate a change instruction message in response to decision of the decision unit; and a transmission unit configured to transmit the change instruction message to the display terminal through the wireless access point to instruct the display terminal to change the state of the wireless communication processing unit from the power save state to the normal state.

BRIEF DESCRIPTION OF THE SEVERAL VIEWS OF THE DRAWING

FIG. 3 is a flowchart illustrating an example of the operation procedure of the main body apparatus;

FIG. 7 is a block diagram showing an arrangement example of a display terminal according to the embodiment;

FIG. 12 is a view for explaining operation examples of the access point and wireless terminal during the power save mode;

FIG. 17 is a sequence chart showing an example of the process sequence of the screen transfer system.

DETAILED DESCRIPTION OF THE INVENTION

An embodiment of the present invention will be described below with reference to the accompanying drawing.

Figure 1:
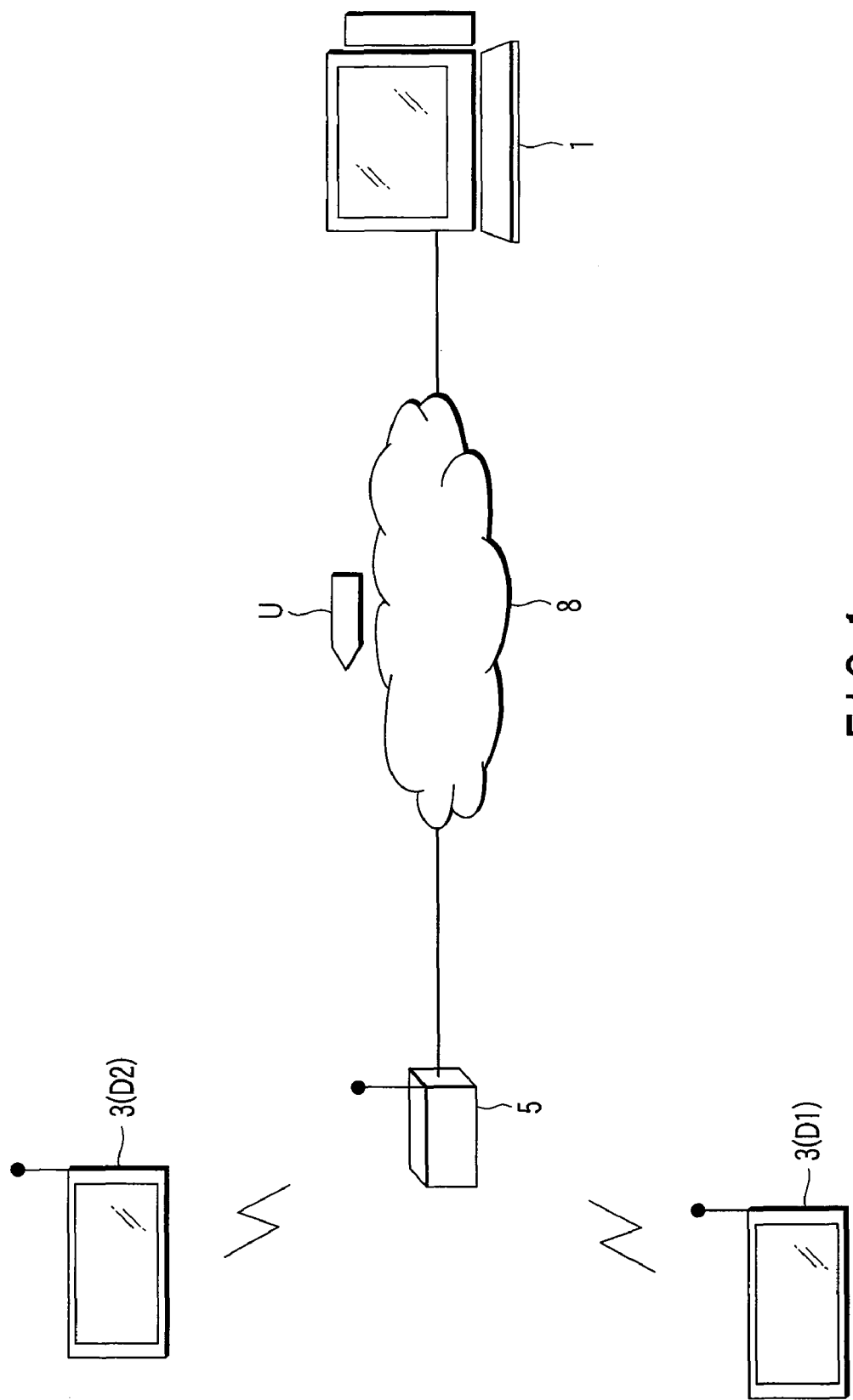
FIG. 1 is a view showing an arrangement example of a screen transfer system according to an embodiment.

FIG. 1 is a view showing an arrangement example of a screen transfer system according to an embodiment. As shown in FIG. 1, the screen transfer system of this embodiment comprises a main body apparatus 1, an access point (wireless access point) 5 connected to the main body apparatus 1 via a network 8, and one or a plurality of display terminals 3 which wirelessly communicate with the access point 5. FIG. 1 exemplifies two display terminals D1 and D2. However, the system can include an arbitrary number of display terminals.

The main body apparatus 1 is a communication apparatus capable of transmitting image data to an arbitrary display terminal 3 through the access point 5. The display terminal 3 is a wireless terminal capable of receiving image data from the main body apparatus 1 through the access point 5 and displaying the received image data.

Generally, the main body apparatus 1 controls to shift the display terminal 3 that normally operates in a power save state (power save mode) to a normal state (active mode) only when buffer overflow is going to occur at the access point 5. This makes it possible to prevent any data loss at the access point 5 while maintaining the power saving capability of the display terminal 3.

An application screen sharing function will be exemplified here. With this function, the image data of the screen of application software running on the main body apparatus 1 is transferred from the main body apparatus 1 to one or a plurality of display terminals 3 as targets through the access point 5, and each display terminal 3 displays the screen of the application software based on the received image data. In the example to be described here, to transfer the screen updated in the main body apparatus 1 to each display terminal 3 in real time, not the image data of the entire screen but only the image data of the updated part in the screen (updated image information U in FIG. 1) is transferred.

The main body apparatus 1 will be described below in detail.

Figure 2:
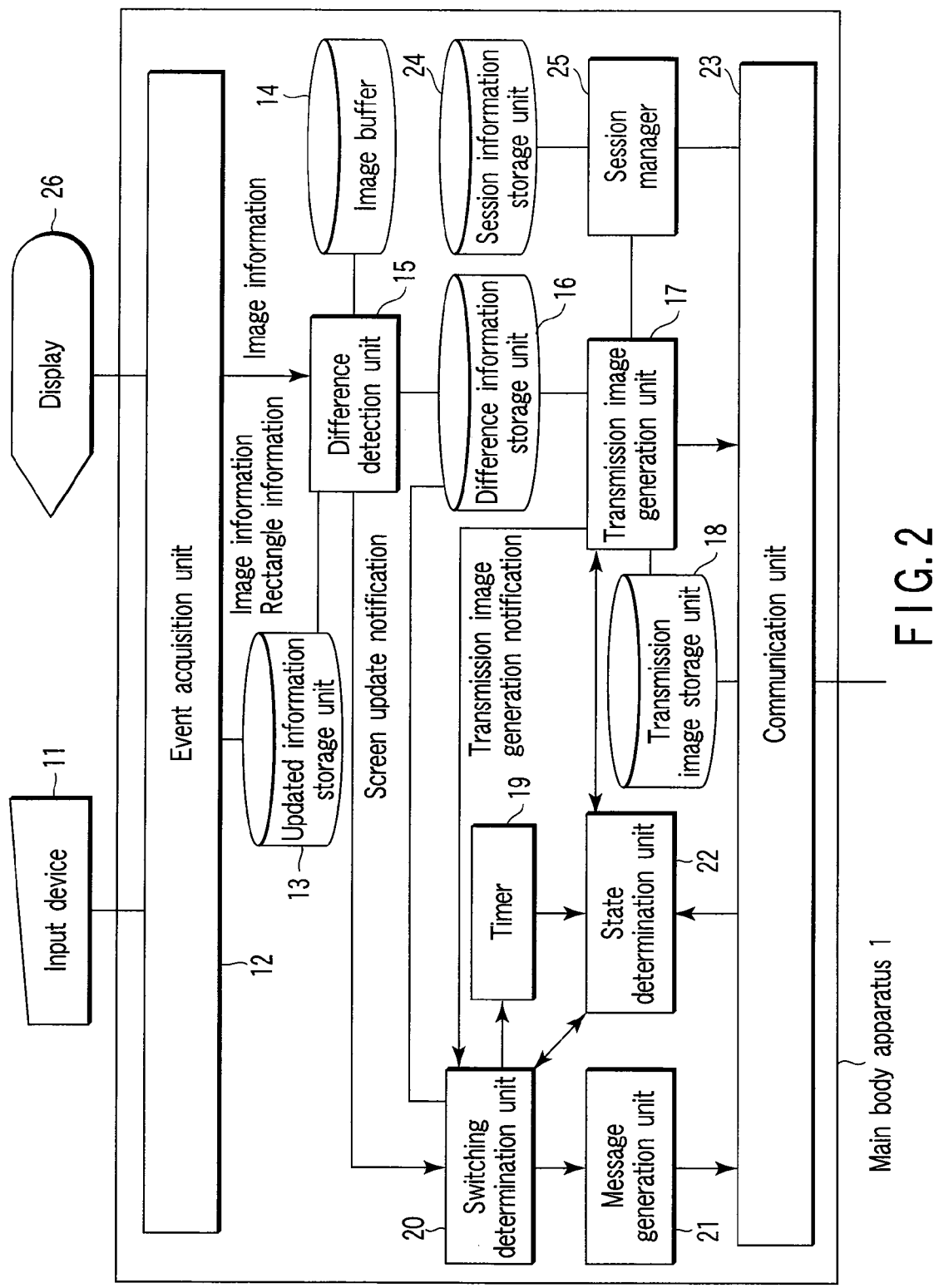
FIG. 2 is a block diagram showing an arrangement example of a main body apparatus according to the embodiment.

FIG. 2 shows an arrangement example of the main body apparatus 1. As shown in FIG. 2, the main body apparatus 1 comprises an input device 11, an event acquisition unit 12, an updated information storage unit 13, an image buffer 14 to store an updated image, difference detection unit 15, a difference information storage unit 16, a transmission image generation unit 17, a transmission image storage unit 18, a timer 19, a switching determination unit 20, a message generation unit 21, a state determination unit 22, a communication unit 23, a session information storage unit 24, a session manager 25, and a display 26.

Note that the main body apparatus 1 may have a communication program as its functional arrangement so that the communication program causes the main body apparatus 1 to execute a process.

The main body apparatus 1 can be implemented by, e.g., a computer including a CPU (Central Processing Unit), memory, hard disk device, and the like.

The input device 11 can be implemented by, e.g., a mouse that moves and operates a cursor displayed on the screen of the display 26 or using a keyboard and trackball.

The event acquisition unit 12 generates image data to be displayed on the display terminal 3 in accordance with an event that occurs by, e.g., the operation of an application program (the event acquisition unit 12 functions as a first generation unit). The image data may be or include still image data.

The event acquisition unit 12 can be implemented by, e.g., an OS (Operating System) which collectively controls the computer, a virtual display driver which is incorporated in the OS and has the same function as a display driver, a frame buffer for image rendering, and an application program such as application software which runs on the OS. In this case, when the application software updates the screen, or the user moves the cursor using the mouse and updates the image of an arbitrary area of the screen, the virtual display driver in the event acquisition unit 12 acquires a rendering instruction from the graphic engine of the OS and executes the rendering process to generate an updated image. The generated image information or the information of an updated rectangular area is stored in the updated information storage unit 13 using a queuing method.

If the information of an updated rectangular area exists in the updated information storage unit 13, the difference detection unit 15 accesses the frame buffer and acquires the coordinates, area, and updated image information of the rectangular area information. If image information exists in the updated information storage unit 13, the image information is the updated image itself. Image data the difference detection unit 15 has acquired from the updated information storage unit 13 or frame buffer are sequentially output to predetermined positions of the image buffer 14 and stored.

The difference detection unit 15 also detects the difference between old and new updated images which are sequentially held in the image buffer 14. That is, the difference detection unit 15 detects the difference between new image data generated by the event acquisition unit 12 and image data buffered in the image buffer 14. The acquired difference information is stored in the difference information storage unit 16 using a queuing method.

Additionally, immediately after detecting the difference, the difference detection unit 15 transmits a screen update notification to the switching determination unit 20.

When difference information exists in the difference information storage unit 16, the transmission image generation unit 17 compresses the difference image for transmission, thereby generating transmission image data as a compressed image. That is, on the basis of the difference detected by the difference detection unit 15, the transmission image generation unit 17 generates transmission image data to be transmitted to the display terminal 3 through the access point 5 (the transmission image generation unit 17 functions as a second generation unit).

Immediately after generating the transmission image data, the transmission image generation unit 17 inquires of the state determination unit 22 about whether the data can be transmitted to the display terminal 3 as a target. If the response from the state determination unit 22 indicates a transmission enable state, the transmission image generation unit 17 transfers the generated transmission image data to the communication unit 23. If the response from the state determination unit 22 indicates a transmission disable state, the transmission image generation unit 17 stores the generated transmission image data in the transmission image storage unit 18 using a queuing method.

Additionally, immediately after generating the transmission image data, the transmission image generation unit 17 transmits a process completion notification to the switching determination unit 20.

The transmission image generation unit 17 and difference detection unit 15 can be implemented by, e.g., screen transfer application software.

Upon receiving the screen update notification from the difference detection unit 15, the switching determination unit 20 checks whether the difference information storage unit 16 stores screen update information in an amount equal to or more than a threshold value t. Upon confirming the existence of screen update information in an amount equal to or more than the threshold value t, the switching determination unit 20 determines to output, to the display terminal 3, an instruction to shift to the active mode.

Upon receiving the process completion notification from the transmission image generation unit 17 and confirming the nonexistence of succeeding screen update through the difference detection unit 15, the switching determination unit 20 determines to shift the display terminal 3 to the power save mode.

Without receiving the notification from the difference detection unit 15, the switching determination unit 20, e.g., periodically checks the amount of screen update information in the difference information storage unit 16. If the amount is equal to or more than the threshold value t, the switching determination unit 20 determines to output, to the display terminal 3, an instruction to shift to the active mode. If the difference information storage unit 16 is empty, the switching determination unit 20 determines to shift the display terminal 3 to the power save mode.

A threshold value ta different from the threshold value t may be provided (ta<t). The switching determination unit 20 checks the amount of screen update information in the difference information storage unit 16, and if the storage amount that was equal to or more than the threshold value t has decreased to the threshold value ta or less, determines to shift the display terminal 3 to the power save mode.

When the switching determination unit 20 confirms the existence of screen update information in an amount equal to or more than the threshold value t, the message generation unit 21 generates, in accordance with the determination result, a normal state shift message to shift the state of the wireless communication processing unit (wireless communication processing unit 31 in FIG. 7) of the display terminal 3 being connected to the access point 5 from the power save mode to the active mode.

When the switching determination unit 20 confirms the nonexistence of succeeding screen update, the message generation unit 21 generates, in accordance with the determination result, a power save state shift message to shift the state of the wireless communication processing unit of the display terminal 3 being connected to the access point 5 from the active mode to the power save mode.

That is, the message generation unit 21 generates a message to instruct shift to an operation state determined by the switching determination unit 20.

The state determination unit 22 determines whether the state of the wireless communication processing unit of the display terminal 3, which is determined by the switching determination unit 20 to shift from the power save mode to the active mode, has completely shifted to the active mode.

Upon being inquired by the transmission image generation unit 17 about whether transmission can be done and determining that the state has completely shifted to the active mode, the state determination unit 22 returns a response indicating a transmission enable state to the transmission image generation unit 17. Upon determining that the state has not completely shifted to the active mode yet, the state determination unit 22 returns a response indicating a transmission disable state to the transmission image generation unit 17.

In the above description, the transmission image generation unit 17 inquires of the state determination unit 22, and the state determination unit 22 returns a response to the transmission image generation unit 17. The state determination unit 22 may send a notification to the transmission image generation unit 17 upon determining the completion of the shift.

If data is present in the transmission image storage unit 18 when the state determination unit 22 determines the completion of the shift, the data is sequentially transmitted.

The session information storage unit 24 stores information of the display terminal 3 which currently has a session with the apparatus (main body apparatus 1) through the access point 5 such as the destination information (e.g., user identification information), information representing whether a session is being used, and information representing the transmission control protocol, e.g., TCP or UDP, in correspondence with each other.

For example, when the main body apparatus 1 has sessions with the two display terminals D1 and D2, as shown in FIG. 1, the access point 5 has also ended negotiation with the display terminals D1 and D2 and been set in a wirelessly communicable state.

That is, in this system, a number of display terminals 3 (e.g., D1 and D2 in FIG. 1) can establish sessions with the single main body apparatus 1. Hence, the session information storage unit 24 stores information to identify the destination of a packet transmitted from the main body apparatus 1.

The communication unit 23 transmits, through the access point 5, the normal state shift message or power save state shift message generated by the message generation unit 21 or the transmission image data generated by the transmission image generation unit 17 to the display terminals 3 (e.g., D1 and D2 in FIG. 1) each having identification information indicated by the session manager 25.

The main body apparatus 1 executes an application process for each of the display terminals 3 (e.g., D1 and D2 in FIG. 1). If the screen state changes, the main body apparatus 1 executes still image compression of the difference information of the updated screen (so-called updated image) to generate the updated screen information U and transmits the updated screen information U to the display terminals 3 (e.g., D1 and D2 in FIG. 1).

FIG. 3 illustrates an example of the operation procedure of the main body apparatus 1.

The main body apparatus 1 detects screen update information (step S11) and checks whether the difference information storage unit 16 stores screen update information in an amount equal to or more than the threshold value t. Upon confirming the existence of screen update information in an amount equal to or more than the threshold value t (step S12), the main body apparatus 1 transmits a normal state shift message to the display terminal 3 (step S13).

The main body apparatus 1 executes still image compression of difference screen information extracted as a rectangular area (step S14).

Upon confirming the nonexistence of succeeding screen update information (step S15), a power save flag is set (step S16).

To wait for state transition of the display terminal 3 from the power save mode to the active mode (step S17), the generated compressed image is stored in the transmission image storage unit 18 using a queuing method (step S18).

When the state of the display terminal 3 has shifted from the power save mode to the active mode (step S17), the main body apparatus 1 transmits the compressed image to the display terminal 3 (step S19).

When the power save flag is ON (step S20), a power save state shift message is transmitted to the display terminal 3 (step S21).

Figure 4:
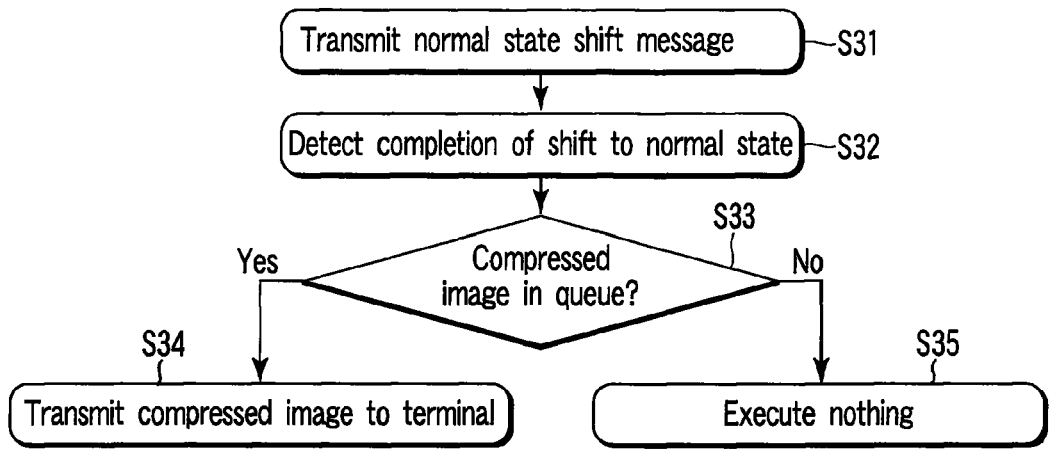
FIG. 4 is a flowchart illustrating an example of the operation procedure of the main body apparatus.

FIG. 4 illustrates an example of the operation procedure of the main body apparatus which has transmitted the normal state shift message to the display terminal 3.

The main body apparatus 1 transmits the normal state shift message to the display terminal 3 (step S31) and waits until it is determined that the state of the display terminal 3 has shifted from the power save mode to the active mode. When it is determined that the display terminal 3 has shifted from the power save mode to the active mode (step S32), and a compressed image exists in the transmission image storage unit 18 using a queuing method (step S33), the compressed image is transmitted to the display terminal 3 (step S34).

The access point 5 will be described below in detail.

Figure 5:
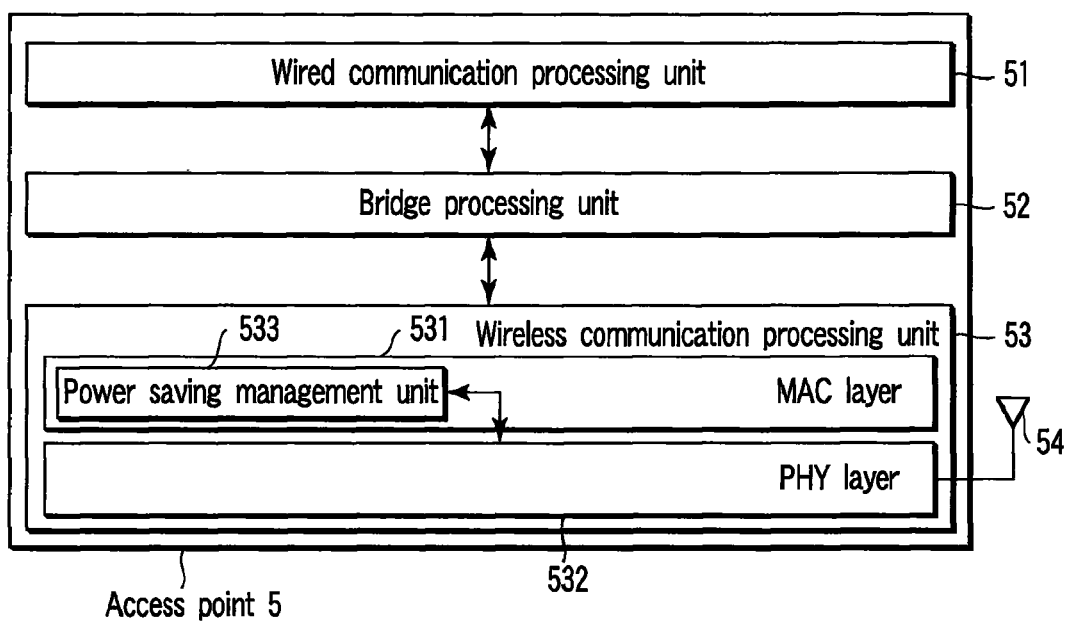
FIG. 5 is a block diagram showing an arrangement example of an access point according to the embodiment.

FIG. 5 shows an arrangement example of the access point 5. As shown in FIG. 5, the access point 5 comprises a wired communication processing unit 51 complying with, e.g., IEEE802.3, a wireless communication processing unit 53 which wirelessly transmits information in accordance with, e.g., IEEE802.11 (e.g., a/b/g), and a bridge processing unit 52 which exchanges information between the wired communication processing unit 51 and the wireless communication processing unit 53.

The wireless communication processing unit 53 has a wireless unit including a MAC (Medium Access Control) layer 531 and PHY (Physical) layer 532, and a power saving management unit 533. The wireless unit has an antenna 54 for transmitting/receiving a physical frame in wireless space.

At the access point 5, data externally input through the wired communication processing unit 51 is subjected to transfer and filtering processes by the bridge processing unit 52 and transferred to the wireless communication processing unit 53. Conversely, data externally input through the wireless communication processing unit 53 is subjected to transfer and filtering processes by the bridge processing unit 52 and transferred to the wired communication processing unit 51.

When the wired communication processing unit 51 receives an updated screen image, the access point 5 confirms the operation state of the wireless communication processing unit (wireless communication processing unit 31 in FIG. 7) of the display terminal 3 from the power saving management unit 533 for the display terminal 3 in the MAC layer. If the display terminal 3 is operating in the active mode, the access point 5 immediately transmits the data. On the other hand, if the display terminal 3 is operating in the power save mode, the access point 5 buffers the data directed to the display terminal 3 and notifies the display terminal 3 of the presence of the data directed to it using control information in a beacon frame that is periodically transmitted.

The power saving management unit 533 of the access point 5 can manage recognition of the active mode or power save mode by analyzing power management information (Power Management Field) in the MAC header of a MAC frame received from the display terminal 3.

Figure 6:
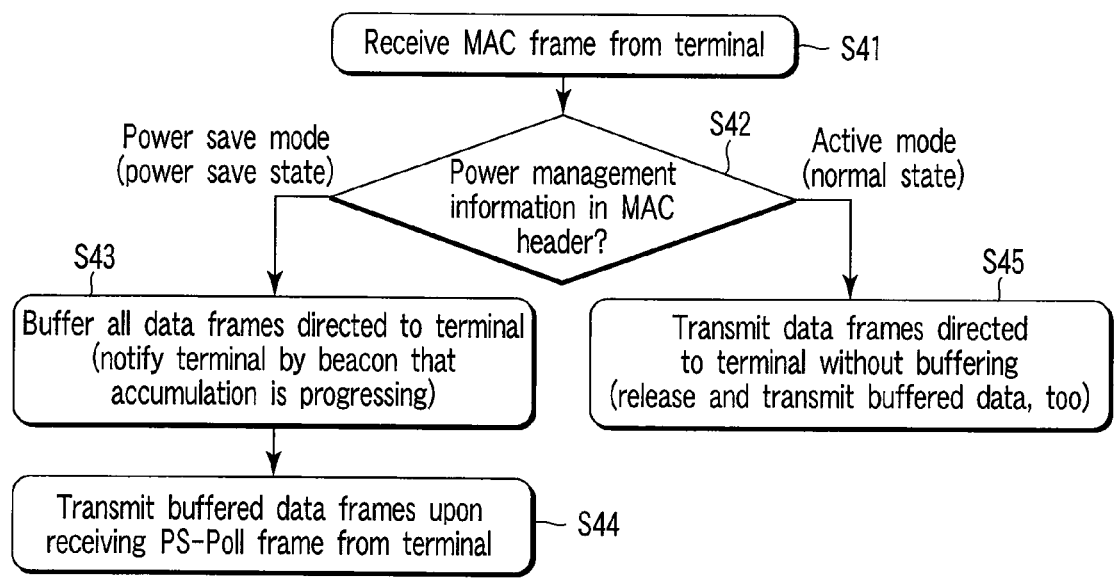
FIG. 6 is a flowchart illustrating an example of the operation procedure of the access point.

FIG. 6 illustrates an example of the operation procedure of the access point 5.

The access point 5 receives a MAC frame from the display terminal 3 (step S41) and checks the power management information in the MAC header. If the information represents the power save mode (step S42), the access point 5 buffers all data frames directed to the display terminal 3 and notifies it that the data frames are being accumulated (step S43). Upon receiving a transmission request (PS-Poll (Power Save Poll)) frame from the display terminal 3, the access point 5 transmits the buffered data frames to the display terminal 3 (step S44).

If the checked power management information in the MAC header represents the active mode (step S42), the access point 5 transmits data frames directed to the display terminal 3 without buffering (also releases and transmits buffered data) (step S45).

The display terminal 3 will be described below in detail.

FIG. 7 shows an arrangement example of the display terminal 3. As shown in FIG. 7, the display terminal 3 comprises a wireless communication processing unit 31, a switching controller 32 which controls switching of the operation state of the wireless communication processing unit 31, a message generation unit 33 which generates a message to notify the main body apparatus 1 of the completion of shift of the operation state of the wireless communication processing unit 31, an image buffer 34 serving as a video memory, a screen generation unit 35, an input information generation unit 36, a session manager 37, a session information storage unit 38, an input/output interface 39, a display 40, and an input device 41.

The wireless communication processing unit 31 has a wireless unit including a MAC layer 311 and PHY layer 312, and a power saving controller 313. The wireless unit has an antenna 42 for transmitting/receiving a physical frame in wireless space.

The session manager 37 and session information storage unit 38 are identical to the session manager 25 and session information storage unit 24 of the main body apparatus 1 shown in FIG. 1.

After the switching controller 32 switches the operation state of the wireless communication processing unit 31 from the power save mode to the active mode, the message generation unit 33 generates a message to notify the main body apparatus 1 that the operation state of the wireless communication processing unit 31 has completely shifted to the active mode.

The power saving controller 313 of the display terminal 3 manages the power saving operation state of the wireless communication processing unit 31. During the operation in the power save mode, the power saving controller 313 supplies power to the transmission/reception system of the wireless communication processing unit 31, including the antenna 42, to shift it to an awake (communication enable) state every interval of receiving a beacon frame from the access point 5. Except that period, the wireless communication processing unit 31 shifts to a doze (communication disable) state and operates using minimum necessary power. When analyzing the information of a beacon frame received from the access point 5 and recognizing that data directed to the display terminal 3 are accumulated, the power saving controller 313 transmits a transmission request frame to the access point 5 to promote frame transmission to the display terminal 3.

The wireless communication processing unit 31 receives, by the antenna 42, a radio signal transmitted from the main body apparatus 1. The wireless communication processing unit 31 generates a packet by demodulating the received radio signal and transfers the data to the switching controller 32 and screen generation unit 35 in accordance with the message type of the packet.

If the packet is a data packet in the screen transfer system, a compressed image is extracted from the packet and transferred to the screen generation unit 35. The screen generation unit 35 decompresses the received compressed image and writes the decompressed image data at a designated rendering position in the image buffer 34 for rendering. That is, the screen generation unit 35 displays, at a designated position of the display 40, a partial image obtained by decompressing the compressed image transmitted from the main body apparatus 1 and received by the wireless unit.

If the packet is a normal state shift message (FIG. 9), it is transferred to the switching controller 32. Upon receiving the message, the switching controller 32 controls to switch the operation state of the wireless communication processing unit 31 from the power save mode to the active mode through the power saving controller 313.

If the packet is a power save state shift message (FIG. 10), it is transferred to the switching controller 32. Upon receiving the message, the switching controller 32 controls to switch the operation state of the wireless communication processing unit 31 from the active mode to the power save mode through the power saving controller 313.

The MAC header of a MAC frame transmitted through the wireless communication processing unit 31 has an information field indicating the operation state of the apparatus (display terminal 3). It is possible to notify the access point 5 of the active mode or power save mode by using the information.

When the display terminal 3 receives updated screen information from the main body apparatus 1 by using TCP (Transmission Control Protocol) as a transport layer protocol and returns a transmission acknowledgement frame through the access point 5, it is possible to simultaneously notify the access point 5 of the state of the wireless communication processing unit 31. However, when UDP (User Datagram Protocol) is used as the transport layer protocol, no transmission acknowledgement frame is present. Hence, the display terminal 3 preferably notifies the access point 5 of the operation state of the wireless communication processing unit 31 by transmitting a frame of some kind.

Alternatively, the display terminal 3 may transmit a packet to the main body apparatus 1 to notify it that the operation state of the wireless communication processing unit 31 has completely shifted to the active mode and also notify the access point 5 that the operation state is the active mode.

Figure 8:
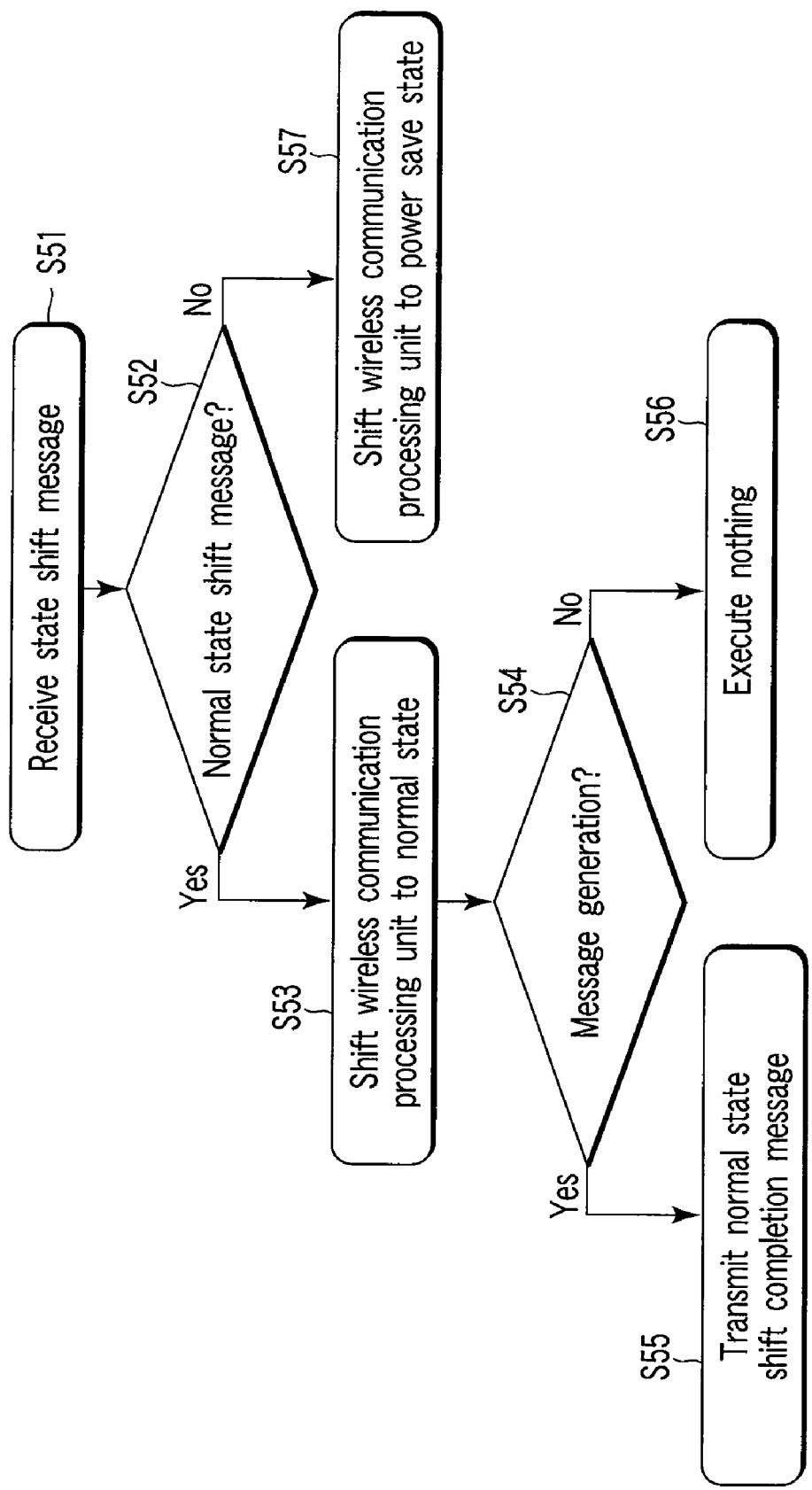
FIG. 8 is a flowchart illustrating an example of the operation procedure of the display terminal.

FIG. 8 illustrates an example of the operation procedure of the display terminal 3.

The display terminal 3 receives a state shift message from the main body apparatus 1 (step S51). If it is the normal state shift message (step S52), the wireless communication processing unit 31 shifts to the active mode (step S53). If a message is generated (step S54), the normal state shift completion message is transmitted (step S55).

If the state shift message received from the main body apparatus 1 is the power save state shift message (step S52), the wireless communication processing unit 31 shifts to the power save mode (step S57).

Figure 9:
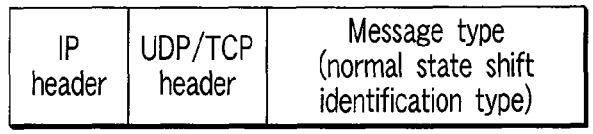
FIG. 9 is a view showing an example of a normal state shift message.

FIG. 9 shows an example of the normal state shift message transmitted from the main body apparatus 1 to the display terminal 3.

As shown in FIG. 9, the normal state shift message includes an IP (Internet Protocol) header, UDP/TCP header, and message type representing shift to the active mode.

The IP header indicates the control information of a network layer.

The UDP/TCP header indicates the control information of a transport layer, which changes depending on whether the transmission control protocol is TCP or UDP.

The message type sets unique type information to identify the normal state shift message.

Upon receiving this message, the display terminal 3 controls to switch the state of the wireless communication processing unit 31 to the active mode through the switching controller 32.

Figure 10:
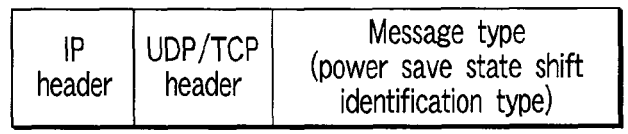
FIG. 10 is a view showing an example of a power save state shift message.

FIG. 10 shows an example of the power save state shift message transmitted from the main body apparatus 1 to the display terminal 3.

As shown in FIG. 10, the power save state shift message includes an IP header, UDP/TCP header, and message type representing shift to the power save mode.

The message type sets unique type information to identify the power save state shift message.

Upon receiving this message, the display terminal 3 controls to switch the state of the wireless communication processing unit 31 to the power save mode through the switching controller 32.

In the above arrangement, the power save state shift message indicates the termination of screen update which continuously occurs in the main body apparatus 1. Hence, if the condition for power save state shift message transmission is satisfied immediately after the end of generation of the transmission image of the latest updated screen, the compressed image (transmission image) and power save state shift message may be integrated.

Figure 11:
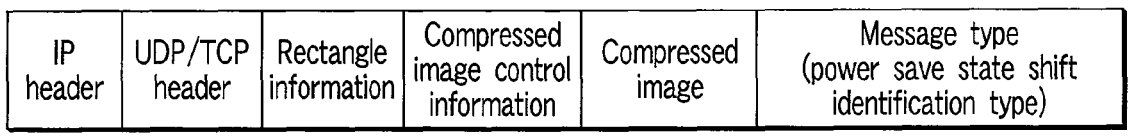
FIG. 11 is a view showing an example of a message which integrates a compressed image and a power save state shift instruction.

FIG. 11 shows a message in this case, which includes an IP header, UDP/TCP header, rectangle information, compressed image control information, compressed image, and message type representing shift to the power save mode.

As described above, the IP header serving as the control information of a network layer and the UDP/TCP header serving as the control information of a transport layer exist.

The rectangle information contains coordinates (e.g., x and y) and area (e.g., vertical and horizontal lengths) to designate a rendering position after the succeeding compressed image is decompressed into a displayable format.

The compressed image control information contains, e.g., a quantization parameter and Huffman table information which are necessary for decoding an image. In, e.g., JPEG (Joint Photographic Experts Group), the control information indicates the range from SOI (Start Of Image) to SOS (Start Of Scan).

The compressed image is image information that has undergone still image compression by the main body apparatus 1. The compressed image is decoded to the original image using the control information for decoding. In JPEG, this information indicates the range from the SOS to EOI (End Of Image).

As shown in FIG. 11, the message type representing shift to the power save mode is added after the compressed image information. This makes it possible to notify the display terminal 3 that the image information in the message indicates the termination of screen update which continuously occurs in the main body apparatus more efficiently as compared to separately creating and transmitting a new message packet.

In the above arrangement, the wireless communication processing unit 31 executes a communication process complying with the IEEE802.11 standard. In IEEE802.11 that employs CSMA/CA (Carrier Sense Multiple Access with Collision Avoidance) as medium access control, the communication speed is increased by changing the protocol of the PHY layer.

For the 2.4-GHz frequency band, IEEE802.11b (11 Mbps) and IEEE802.11g (54 Mbps) standards are produced from IEEE802.11 (2 Mbps), and the wireless communication processing unit 31 supports these frequency bands. For the 5-GHz frequency band, currently, IEEE802.11a (54 Mbps) is present, and the wireless communication processing unit 31 supports this frequency band, too.

IEEE802.11 defines a method related to power saving. More specifically, a wireless terminal has two operation modes: an active mode which is always in communication enable state and a power save mode which periodically switches between communication enable and disable states. In the power save mode, the terminal supplies power to the transmission/reception system of the wireless processing unit to shift to an awake state every interval of receiving a beacon frame from an access point. Except that period, the terminal shifts to a doze state and operates using minimum necessary power.

FIG. 12 shows examples of the operation of the wireless terminal (display terminal 3 in FIG. 1) during the power save mode.

FIG. 12(a) indicates a time axis. A beacon frame is generated at the beacon interval and broadcast to a wireless network managed by the access point (BSS (Basic Service Set)).

FIG. 12(b) shows an example of a frame transmitted from an access point (access point 5 in FIG. 1). A beacon frame has an identification field called TIM (Traffic Indication Message). If a MAC data frame directed to the wireless terminal exists, a corresponding bit in TIM is set to notify the wireless terminal of it. The access point releases accumulated multicast/broadcast frames from the buffer and transmits them every time interval called DTIM (Delivery Traffic Indication Message) (DTIM Interval).

FIG. 12(c) shows an example of the operation of the wireless terminal in the power save mode. The wireless terminal supplies power to the transmission/reception system of the wireless processing unit (wireless communication processing unit 31 in FIG. 7) to shift to an awake state and executes a beacon frame reception process every designated beacon reception interval. If frames directed to the wireless terminal are accumulated at the access point, the wireless terminal transmits a transmission request (PS-Poll) frame and maintains the awake state until reception of the frames directed to the wireless terminal as a response finishes. The wireless terminal also shifts from the doze state to the awake state at the DTIM interval and receives multicast/broadcast frames.

Figure 13:
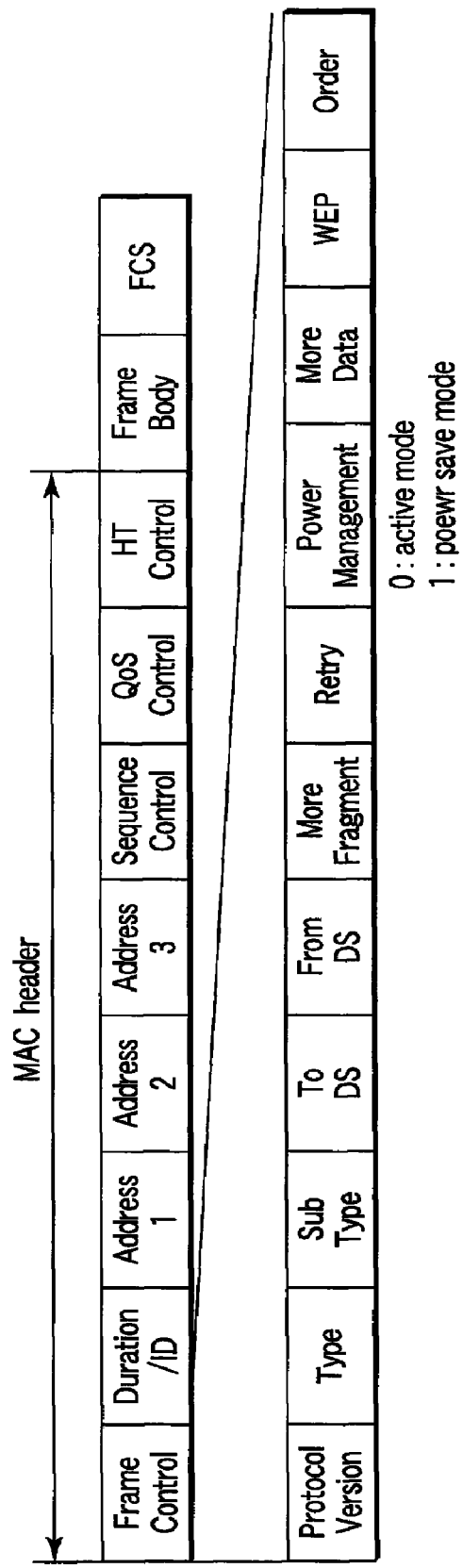
FIG. 13 is a view showing the structure of a MAC frame.

FIG. 13 shows the structure of a MAC frame. A power management bit exists in a frame control field to store control information.

The power management bit is designated to notify the access point that the wireless communication processing unit 31 is operating now in the active mode or power save mode.

The access point buffers data frames directed to the wireless terminal operating in the power save mode without transmitting them. Hence, if the power saving control (power save mode) of IEEE802.11 is simply applied to the system in FIG. 1, pieces of screen update information may be accumulated in the buffer of the access point, and buffer overflow may occur.

An operation example of the screen transfer system according to this embodiment will be described below in more detail with reference to FIGS. 14 to 18.

An example will be explained here, in which a screen transfer application such as VNC (Virtual Network Computing) is used between the main body apparatus 1 and one (e.g., display terminal D1 in FIG. 1) of the plurality of display terminals 3, and the screen information of the main body apparatus 1 is transferred to the display terminal D1, thereby implementing an application screen sharing function.

Figure 14:
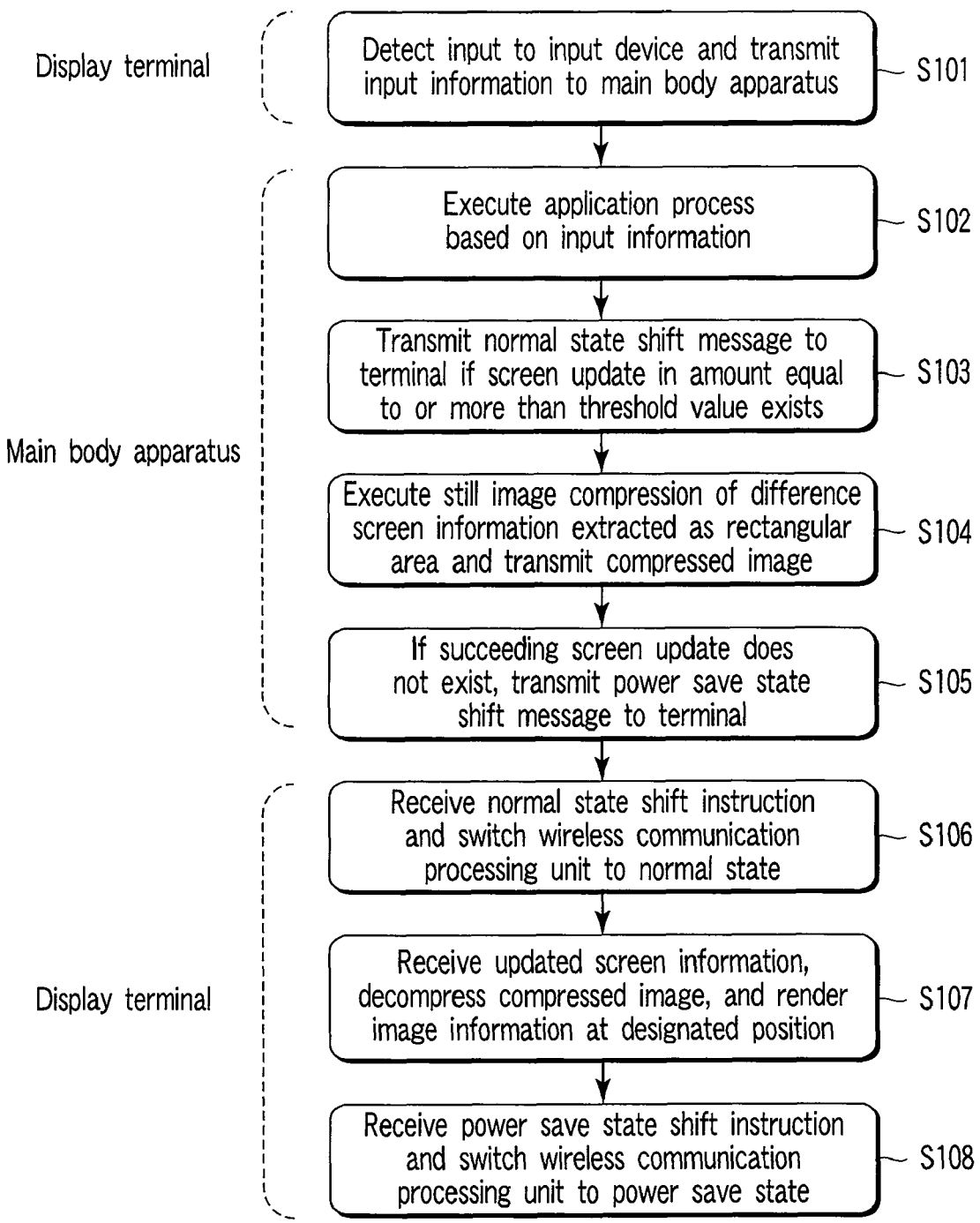
FIG. 14 is a flowchart illustrating an example of the process sequence of the screen transfer system.

The schematic operation of the screen transfer system in this case will be described with reference to the operation example in FIG. 14.

Assume that the display terminal 3 normally operates the wireless communication processing unit 31 in the power save mode. As described above, the access point 5 buffers data frames directed to the display terminal 3 operating in the power save mode. The access point 5 notifies the display terminal 3 by periodical beacon frames that the data directed to it are accumulated. The display terminal 3 recognizes in accordance with the beacon frames that the data directed to it are accumulated and transmits a transmission request (PS-Poll) frame to the access point 5 to promote release of data frames. Hence, during the operation in the power save mode, the access point can buffer data frames at maximum during the time corresponding to the designated beacon reception interval.

The display terminal 3 has the input device 41 like a digitizer, as shown in FIG. 7, and detects input to the input device 41 through the input/output interface 39 (step S101). Simultaneously, the display terminal 3 acquires input information such as coordinates. The input information generation unit 36 generates a message containing the input information. The message is transmitted to the main body apparatus 1 through the access point 5.

The main body apparatus 1 regards the input information received from the display terminal 3 as an event such as a mouse operation (e.g., click or drag-and-drop) on the window system and executes an application process based on the input information (step S102).

In executing the application process, update of the screen state can occur due to, e.g., mouse movement or new window activation. The event acquisition unit 12 of the main body apparatus 1 outputs, to the updated information storage unit 13, a partial image corresponding to the change in the screen or updated rectangular area information obtained from the OS. The difference detection unit 15 acquires the partial image via the updated information storage unit 13. Additionally, the difference detection unit 15 obtains the difference between the received partial image and the image precedingly transmitted to the display terminal 3 and stores the difference information in the difference information storage unit 16 while sequentially storing the partial image in the image buffer 13. The difference image is compressed by the transmission image generation unit 17 for transmission and then transmitted to the display terminal 3.

The transmission image generation unit 17 generates a compressed image by executing still image compression of the received updated image. The transmission image generation unit 17 also receives destination information from the session manager 25, generates a transmission packet, and transfers the generated packet to the communication unit 23. The communication unit 23 transmits the received packet (updated screen information U in FIG. 1) to the network 8 (step S104).

Screen update continuously occurs. In fact, the acquired rectangular area is subjected to a time-lapse process in accordance with the usable band of the network 8, and screen information to be actually transmitted is selected, compressed by sill image compression, and transmitted.

The still image compression process by the transmission image generation unit 17 can be either lossy compression such as JPEG (Joint Photographic Experts Group) or lossless compression.

The updated information storage unit 13 of the main body apparatus 1 stores screen information and rectangle information as a queue. The difference detection unit 15 extracts the information from the top of the queue on the basis of the FIFO procedure. In addition, the difference information storage unit 16 of the main body apparatus 1 stores updated images as a queue. The transmission image generation unit 17 extracts the information from the top of the queue on the basis of the FIFO procedure. Hence, if the difference information storage unit 16 accumulates updated image in an amount equal to or more than a threshold value, the normal state shift message is transmitted to the display terminal 3 (step S103). On the other hand, if the updated information storage unit 13 stores neither screen information nor rectangle information, the power save state shift message is transmitted to the display terminal (step S105).

Upon detecting screen update, the difference detection unit 15 notifies the switching determination unit 20 of it. The switching determination unit 20 checks through the difference information storage unit 16 whether screen update in an amount equal to or more than a threshold value exists. If screen update in an amount equal to or more than the threshold value exists, the message generation unit 21 generates the normal state shift message, and the communication unit 23 transmits it to the display terminal 3.

The initial value of the threshold value may be determined by, e.g., estimating the available capacity of the buffer of the access point while transmitting test data.

A packet loss caused by buffer overflow in the access point may occur. As a measure against this, a packet loss detection unit and a threshold value updating unit may be provided in the main body apparatus 1. When the packet loss detection unit detects a packet loss, the threshold value updating unit updates the threshold value to a smaller value. For example, when TCP is used as the transport layer protocol, a packet loss can be detected by a resending frame. When UDP is used, for example, the display terminal 3 may determine a data loss and notify the main body apparatus 1 of it.

The main body apparatus 1 transmits the normal state shift message and waits until the display terminal 3 shifts to the active mode. While waiting for the active mode shift of the display terminal 3, the main body apparatus 1 executes the process of compressing the image of the rectangular area detected by the difference detection unit 15 for transmission to avoid generation of wasteful waiting time.

Figure 15:
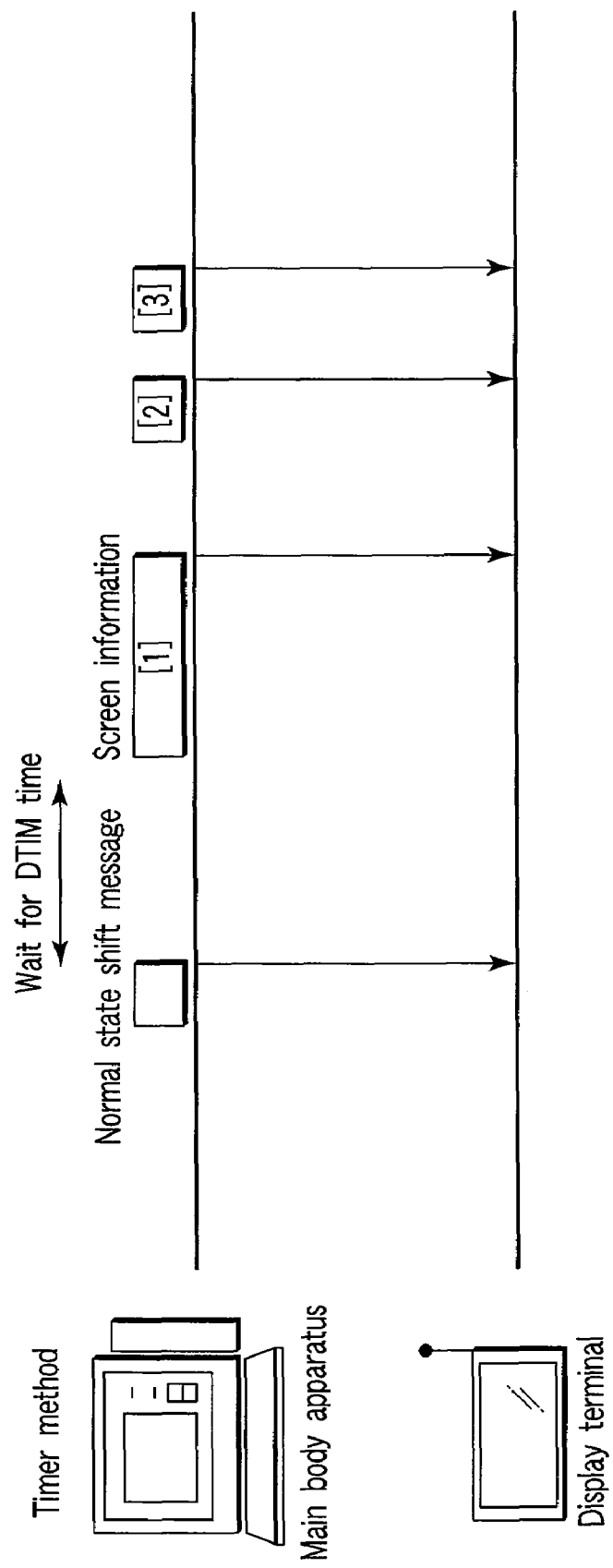
FIG. 15 is a view for explaining a first example in which the main body apparatus determines whether the display terminal has completely shifted to the active mode.

FIG. 15 shows an example of a method of causing the main body apparatus 1 to determine whether the wireless communication processing unit 31 of the display terminal 3 has completely shifted to the active mode.

FIG. 15 shows a method using the timer 19. Upon determining a shift from the power save mode to the active mode, the switching determination unit 20 instructs the timer 19 to start a timer process. When a timeout occurs, the state determination unit 22 determines that the display terminal 3 has completely shifted to the active mode.

According to the IEEE802.11 standard, the terminal operating in the power save mode shifts to the awake state at the DTIM interval. Upon receiving, from the access point, a message representing the existence of data to be transmitted, the terminal transmits a PS-Poll frame to the access point and receives the data. Hence, the normal state shift message can be buffered for the DTIM time at maximum. Accordingly, the process waits for the DTIM time.

Figure 16:
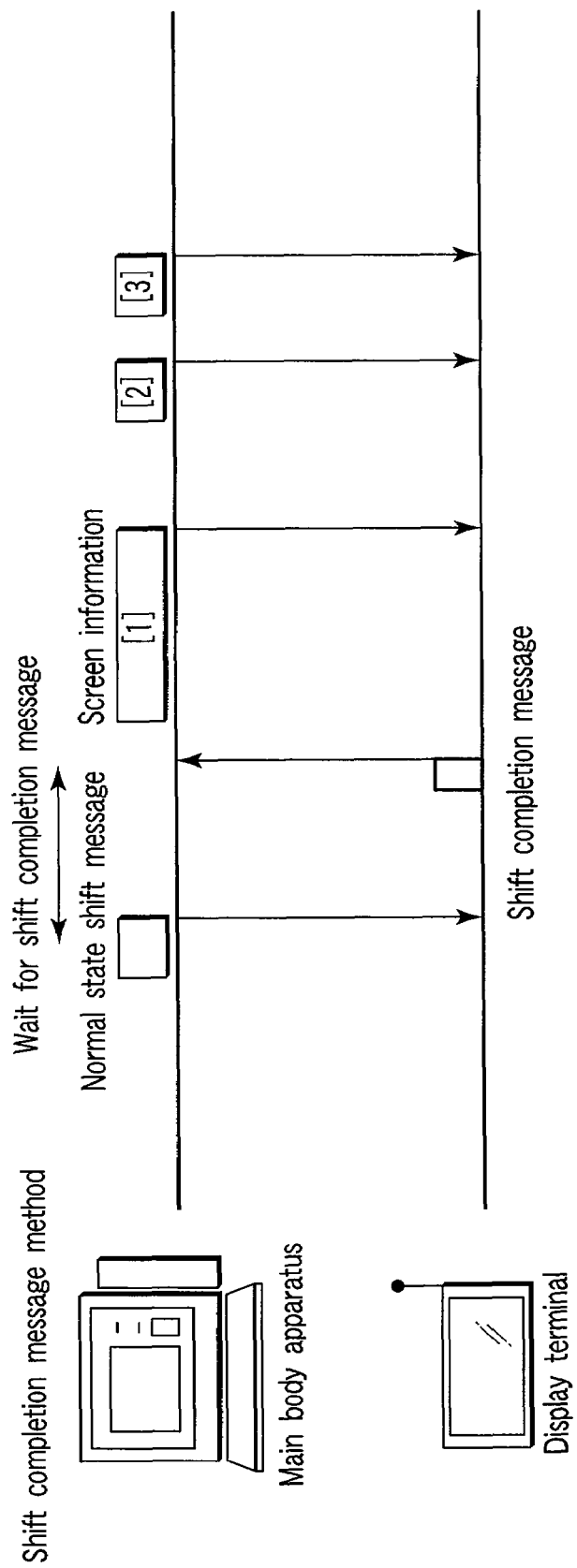
FIG. 16 is a view for explaining a second example in which the main body apparatus determines whether the display terminal has completely shifted to the active mode.

FIG. 16 shows another example of a method of causing the main body apparatus 1 to determine whether the wireless communication processing unit 31 of the display terminal 3 has completely shifted to the active mode.

FIG. 16 shows a method using a message from the display terminal 3. When the communication unit 23 receives the normal state shift completion message from the display terminal 3, the state determination unit 22 determines that the display terminal 3 has completely shifted to the active mode. When TCP is used as the transport layer protocol, a transmission acknowledgement frame can be used as the normal state shift completion message. However, when UDP is used, a frame of some kind is transmitted.

The updated screen information U sent from the main body apparatus 1 to the network 8 is transmitted from the access point 5 to a wireless transmission path. The display terminal D1 receives, at the antenna 42, the updated screen information U wirelessly transmitted from the access point 5. The wireless communication processing unit 31 decodes the information to the compressed image and transfers it to the screen generation unit 35. The screen generation unit 35 decompresses the received compressed image and writes it in the image buffer 34, thereby rendering the rectangular area information in a designated area (step S107).

Upon receiving a normal state shift instruction from the main body apparatus 1, the display terminal 3 executes a process of shifting the state of the wireless communication processing unit 31 to the active mode through the switching controller 32 (step S106).

Upon receiving a power save state shift instruction from the main body apparatus 1, the display terminal 3 executes a process of shifting the state of the wireless communication processing unit 31 to the power save mode through the switching controller 32 (step S108).

Figure 18:
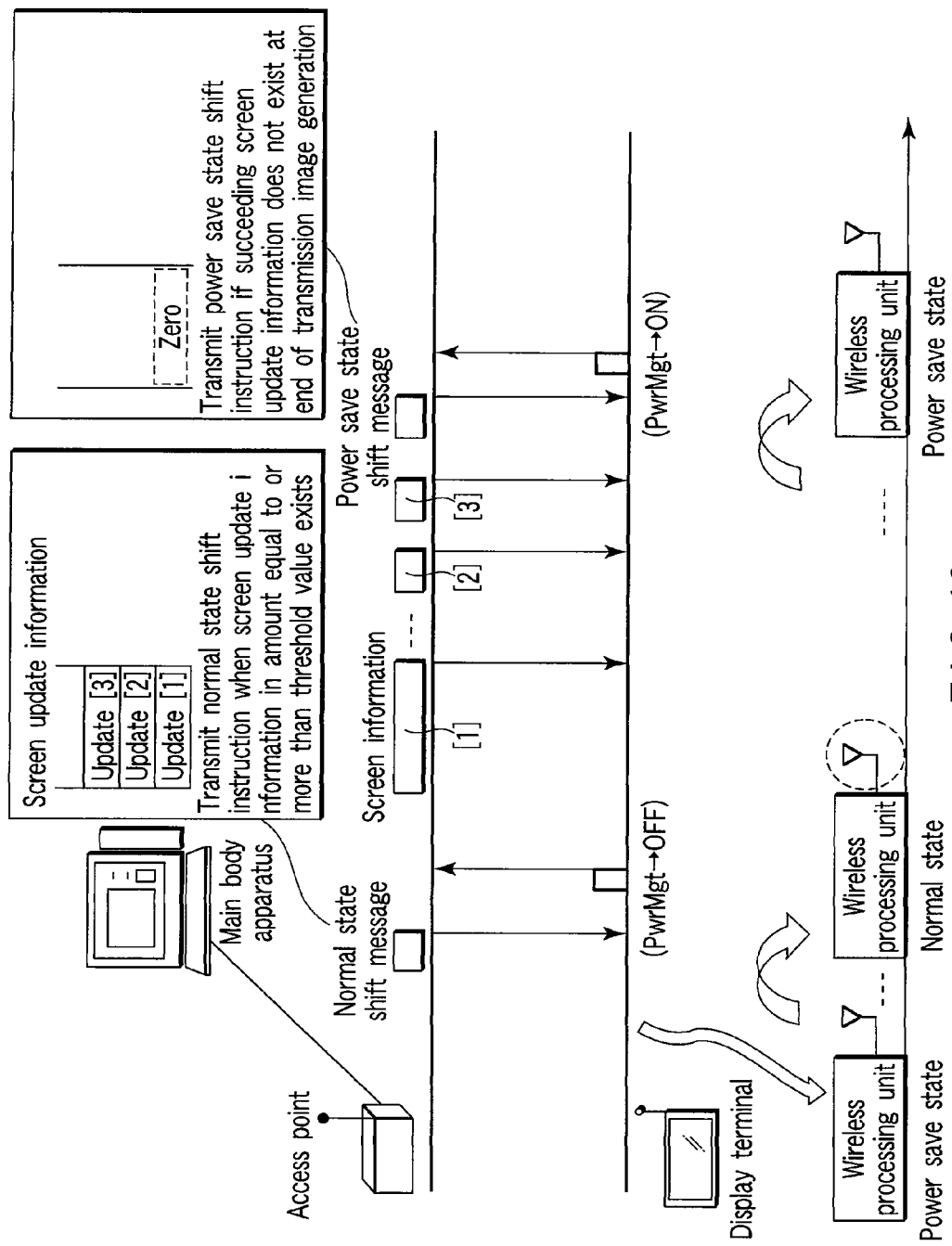
FIG. 18 is a sequence chart showing an example of the process sequence of the screen transfer system.

FIGS. 17 and 18 show the sequence of the above-described process.

A PPDU (PLCP Protocol Data Unit) in FIG. 17 is a physical layer transmission unit in a wireless LAN, which is formed by adding a physical header, physical preamble, trailer, and the like to a MAC frame. In power management bit information (PwrMgt) in the MAC header information of the frame, a flag representing that the terminal is operating in the active mode is ON. The access point receives this frame and recognizes the state of the wireless communication processing unit of the terminal.

Assume that the main body apparatus 1 executes an application process based on input information received from the display terminal 3 through the access point 5, and consequently, screen update occurs at three points [1] to [3], as shown in FIGS. 17 and 18. The main body apparatus 1 transmits the series of latest screen update information to the display terminal 3, and then generates a power save state shift message and transmits it to the display terminal 3.

Upon receiving a normal state shift message from the main body apparatus 1, the display terminal 3 switches the state of the wireless communication processing unit 31 from the power save mode to the active mode. Then, the display terminal 3 receives the updated screen from the main body apparatus 1 while keeping the wireless communication processing unit 31 set in the active mode. Upon receiving a power save state shift message, the wireless communication processing unit 31 shifts to the power save mode again.

If a two-way transport layer protocol such as TCP is used between the display terminal 3 and the main body apparatus 1, the display terminal 3 can notify the access point 5 of the state of the wireless communication processing unit 31 in it (display terminal 3) after state transition simultaneously with return of a TCP delivery acknowledgement (ACK) for data (normal state shift message or power save state shift message) from the main body apparatus 1. If a one-way transport layer protocol such as UDP is used, the display terminal 3 preferably switches the state of the wireless communication processing unit 31 in it (display terminal 3) and then transmits a frame of some kind to the main body apparatus 1 or access point 5.

In the above explanation, the switching determination unit 20 of the main body apparatus 1 checks the amount of screen update information in the difference information storage unit 16. If the amount is equal to or more than the threshold value t, the switching determination unit 20 determines to send a normal state shift instruction to the display terminal 3. Then, a normal state shift message is generated and transmitted to the display terminal 3. Alternatively, the switching determination unit 20 may check the amount of transmission image data in the transmission image storage unit 18. If the amount is equal to or more than a threshold value t', a normal state shift message is generated and transmitted to the display terminal 3. This also applies to determination related to the power save state shift message.

In the above explanation, determination related to the power save state shift message is done on the basis of the information storage amount. Various other methods are also available, and for example, the switching determination unit 20 may determine to shift the display terminal 3 to the power save mode when a predetermined time (e.g., a predetermined time enough for completion of information transmission) elapses from transmission of a normal state shift message. Alternatively, it may be determined to shift the display terminal 3 to the power save mode upon receiving a specific instruction from the user or application.

After the main body apparatus 1 transmits the power save state shift message to the display terminal 3, the state determination unit 22 determines in the following way whether the display terminal 3 has completely shifted to the power save mode. Like determination about the completion of normal state shift of the display terminal 3, the display terminal 3 which has completely shifted to the power save mode may transmit a power save mode shift completion message to the main body apparatus 1. Hence, upon receiving the power save mode shift completion message from the display terminal 3, the state determination unit 22 determines that the display terminal 3 has completely shifted to the power save mode. Alternatively, the state determination unit 22 may determine that the display terminal 3 has completely shifted to the power save mode after the elapse of a predetermined time from transmission of a power save state shift message to the display terminal 3.

In the above explanation, the main body apparatus 1 transmits a power save state shift message to the display terminal 3. Instead of causing the main body apparatus 1 to transmit the power save state shift message to the display terminal 3, the display terminal 3 may receive a normal state shift message from the main body apparatus 1, shift to the active mode, and return to the power save mode if, e.g., a state wherein no information is received from the main body apparatus 1 continues for a predetermined time after information reception from the main body apparatus 1. In this case, upon receiving a power save mode shift completion message from the display terminal 3, the main body apparatus 1 determines that the display terminal 3 has completely shifted to the power save mode. Alternatively, the main body apparatus 1 may determine that the display terminal 3 has completely shifted to the power save mode when a predetermined time elapses from transmission of a normal state shift message to the display terminal 3.

In the above-described embodiment, the main body apparatus transmits compressed information. However, the embodiment can be achieved even when the main body apparatus transmits information without compression.

In the above-described embodiment, image information generated in the main body apparatus is transmitted. However, the embodiment can be achieved even when the main body apparatus transmits externally input information.

Note that the above-described functions can be described as software and executed by a computer having an appropriate mechanism.

The embodiment can be practiced as a program which causes a computer to execute a predetermined procedure, causes a computer to function as a predetermined means, or causes a computer to implement a predetermined function. The embodiment can also be practiced as a computer-readable recording medium which records the program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus for communicating with a display terminal including a wireless communication processing unit adopted to receive image information and a display screen to display the image information, the communication apparatus comprising:
   an image information acquisition unit configured to acquire new image information to be transmitted to the display terminal through a wireless access point;
   a storage unit configured to temporarily store the image information;
   a decision unit configured to decide to change a state of the wireless communication processing unit from a power save state to a normal state when an amount of the image information stored in the storage unit is not less than a predetermined threshold value;
   a message generation unit configured to generate a change instruction message in response to decision of the decision unit; and
   a transmission unit configured to transmit the change instruction message to the display terminal through the wireless access point to instruct the display terminal to change the state of the wireless communication processing unit from the power save state to the normal state.

2. The apparatus according to claim 1, which further comprises a compression unit configured to compress the image information, and
   in which the transmission unit is configured to transmit the compressed image information to the display terminal.

3. The apparatus according to claim 2, wherein
   the transmission unit is configured to transmit the change instruction message to the display terminal before transmission of the compressed image information to the display terminal when the decision unit has made the decision, and
   the compression unit is configured to proceed with compression of the image information while the display terminal is shifting to the normal state in accordance with the change instruction message.

4. The apparatus according to claim 1, wherein the image information indicates an updated part of screen contents displayed on the display screen of the display terminal, which is acquired when the screen contents are updated.

5. The apparatus according to claim 4, further comprising a detection unit configured to detect the updated part of the screen contents.

6. The apparatus according to claim 1, further comprising a determination unit configured to execute determination related to the state of the wireless communication processing unit of the display terminal.

7. The apparatus according to claim 6, wherein the determination unit is configured to determine that the state of the wireless communication processing unit has completely shifted to the normal state when a predetermined time elapses from transmission of the change instruction message to the display terminal.

8. The apparatus according to claim 6, wherein the determination unit is configured to determine that the state of the wireless communication processing unit has completely shifted to the normal state upon receiving a completion message representing completion of shift to the normal state from the display terminal to which the change instruction message is transmitted.

9. The apparatus according to claim 6, wherein
the determination unit is configured to determine to change the state of the wireless communication processing unit from the normal state to the power save state when a specific condition is satisfied,
the message generation unit is configured to generate another change instruction message to instruct to change the state of the wireless communication processing unit of the display terminal from the normal state to the power save state when the determination unit determines to change the state of the wireless communication processing unit from the normal state to the power save state, and
the transmission unit is configured to transmit the generated another change instruction message to the display terminal.

10. The apparatus according to claim 9, wherein the determination unit is configured to determine to change the state of the wireless communication processing unit from the normal state to the power save state when the amount of the image information stored in the storage unit is not less than the predetermined threshold value and then reaches not more than a value smaller than the predetermined threshold value, the value being indicated by a threshold value different from the predetermined threshold value.

11. The apparatus according to claim 6, wherein the determination unit is configured to determine, on the basis of an elapse of a predetermined time without transmitting the another change instruction message to the display terminal, that the state of the wireless communication processing unit has completely shifted to the power save state when the amount of the image information stored in the storage unit is not less than the predetermined threshold value and then reaches not more than a value smaller than the predetermined threshold value, the value being indicated by a threshold value different from the predetermined threshold value.

12. The apparatus according to claim 1, further comprising:
a packet loss detection unit configured to detect a packet loss related to the image information transmitted to the display terminal; and
a threshold value updating unit configured to update the predetermined threshold value to a smaller value when the packet loss is detected.

13. A communication method between a communication apparatus and a display terminal, comprising:
temporarily storing, in a storage unit of the communication apparatus, new image information to be transmitted to a display terminal through a wireless access point;
deciding to change a state of a wireless communication processing unit of the display terminal from a power save state to a normal state when an amount of the stored image information of the storage unit is not less than a predetermined threshold value;
generating a change instruction message in response to decision in the deciding; and
transmitting the change instruction message from the communication apparatus to the display terminal through a wireless access point to instruct the display terminal to change the state of the wireless communication processing unit from the power save state to the normal state.

14. A computer readable storage medium storing instructions of a computer program which when executed by a computer results in performance of steps comprising:
temporarily storing, in a storage unit of the communication apparatus, new image information to be transmitted to a display terminal through a wireless access point;
deciding to change a state of a wireless communication processing unit of the display terminal from a power save state to a normal state when an amount of the stored image information of the storage unit is not less than a predetermined threshold value;
generating a change instruction message in response to decision in the deciding; and
transmitting the change instruction message from the communication apparatus to the display terminal through a wireless access point to instruct the display terminal to change the state of the wireless communication processing unit from the power save state to the normal state.

15. A communication system, including one or a plurality of display terminals and a communication apparatus,
the communication apparatus comprising:
an image information acquisition unit configured to acquire new image information to be transmitted to the display terminal through a wireless access point;
a storage unit configured to temporarily store the image information,
the display terminal comprising:
a wireless communication processing unit configured to execute wireless communication with the communication apparatus through the wireless access point;
a screen generation unit configured to execute display on a display screen on the basis of the image information received by the wireless communication processing unit,
the communication apparatus further comprising:
a decision unit configured to decide to change a state of the wireless communication processing unit from a power save state to a normal state when an amount of the image information stored in the storage unit is not less than a predetermined threshold value;
a message generation unit configured to generate a change instruction message in response to decision of the decision unit; and
a transmission unit configured to transmit the change instruction message to the display terminal through the wireless access point to instruct the display terminal to change the state of the wireless communication processing unit from the power save state to the normal state, and
the display terminal further comprising:
a control unit configured to switch the state of the wireless communication processing unit from the power save state to the normal state upon receiving the change instruction message from the communication apparatus.

* * * * *